United States Patent [19]

Roseen

[11] 3,972,548

[45] Aug. 3, 1976

[54] METHOD OF JOINING COMPONENTS MADE OF CROSS-LINKED POLYMERS

[75] Inventor: Rutger Arvid Roseen, Nykoping, Sweden

[73] Assignee: Aktiebolaget Atomenergi, Stockholm, Sweden

[22] Filed: Nov. 20, 1974

[21] Appl. No.: 525,562

[30] Foreign Application Priority Data

Nov. 27, 1973 Sweden .............................. 7316031

[52] U.S. Cl. ............................... 285/381; 156/158; 156/198; 156/272; 156/294; 156/296; 156/304; 264/342 R; 264/DIG. 71; 285/156; 285/423; 285/DIG. 10

[51] Int. Cl.² ........................................ F16L 47/00

[58] Field of Search .................... 156/84–86, 156/83, 158, 198, 272, 293, 294, 296, 303.1, 304; 285/381, 423, 156, DIG. 10, 382.4, 382, 423; 138/155; 264/DIG. 71, 342 R

[56] References Cited

UNITED STATES PATENTS

| | | | |
|---|---|---|---|
| 2,739,829 | 3/1956 | Pedlow et al. | 156/86 |
| 3,276,929 | 10/1966 | Ferch | 156/86 |
| 3,315,986 | 4/1967 | Quick | 285/21 |
| 3,610,291 | 10/1971 | Heslop et al. | 156/86 |
| 3,654,008 | 4/1972 | Rogers et al. | 285/156 |
| 3,768,841 | 10/1973 | Byrne | 285/423 |
| 3,848,904 | 11/1974 | Anderson | 285/230 |

*Primary Examiner*—Edward G. Whitby
*Attorney, Agent, or Firm*—Toren, McGeady and Stanger

[57] ABSTRACT

The invention relates to a method of joining components made of cross-linked polymers, at least one of the components being a tube, which method comprises deforming at least one of the components so as to deviate from the cross-linking shape, inserting an end of the tube into the other component, and heating the joint location to the temperature where the deformed components tend to return to the cross-linking shape, the heating being maintained for a time sufficient to produce fusing together over the joint location.

27 Claims, 9 Drawing Figures

METHOD OF JOINING COMPONENTS MADE OF CROSS-LINKED POLYMERS

The present invention relates to a method of joining components made of cross-linked polymers, and in particular of joining one tube to another or a tube to a wall. The term "wall" used in this context, is intended to signify a wall not only in a tube but also in any other component, for example a junction box, which means that the method can be used not only to connect together the ends of two tubes but can also be used to manufacture tube sections, tee-pieces or junction boxes. The term "tube" is intended in particular to describe rigid or shape-retaining tubes, for example for carrying liquids or gases.

Tubes of cross-linked polyethylene for hot water applications have recently appeared on the market. These tubes have excellent properties from the stability point of view but have a major drawback, namely that unlike tubes of ordinary polyethylene (a thermoplastic material) they cannot be melted. Tubes of cross-linked polyethylene cannot therefore be welded. A high temperature heat treatment simply leads to breakdown of the polymer. Again, in respect of other polyethylenes, no effective bonding method is yet known. To join tubes, it has therefore been necessary to employ metal coupling arrangements, a technique which has not turned out to be satisfactory, however. The major difference in coefficient of thermal expansion between polymer and metal, gives rise to shrinkage and consequent leakage.

A major problem associated with the application of cross-linked polymers, furthermore, is that at the present state of the art it is impossible to manufacture coupling components of the same material. There is consequently no option but to employ tube sections of different kinds of material such as metal or special plastics. The difficulty in using metal is again that the coefficients of thermal expansion are so radically different, that this again means distortion and leakage. Quite generally, plastics have a very low modulus and, moreover, they creep, meaning that clamp coupling arrangements gradually start to leak. A novel method of joining and the development of new and better types of junction boxes and tube sections, is a necessary prerequisite for the successful application of these polymers in hot water lines and in components such as radiators and convectors.

In accordance with the present invention, a method is created by means of which the above drawbacks are obviated. The method, moreover, is much simpler and cheaper than the methods hitherto used.

The method in accordance with the invention is one in which either a start is made with the ends of the tubes which are to be joined, at least one of these ends being deformed so that one tube end can be inserted into the other, or, an opening is made in a wall and the thus formed opening deformed and/or the end of another tube, so that said tube end can be inserted into the opening, in either of which cases at least one of the deformed tube ends and/or the deformed opening, being given a shape which deviates from the shape obtained at the moment of cross-linking of the polymer, one pipe end being inserted into the other or into the opening, as the case may be, in order to form a joint, and the joint location being heated to the temperature at which the deformed tube, as a consequence of the so-called memory effect, tends to return to the shape it had in the cross-linking situation so that a shrinkage type joint is obtained, the heating being maintained for a time sufficient to produce fusing together over the joint location.

The method is based upon the fact that cross-linked polymers possess a so-called memory effect which means that beyond a certain temperature, the crystalline melting point or glass transition temperature ($T_g$), depending upon the degree of crystallinity of the polymer, they tend to revert to the shape which they had on the occasion of the cross-linking process. This shape or configuration constitutes the equilibrium state of the material.

The memory effect of cross-linked polymers is well known per se and has formerly been employed in the case of soft, so-called shrink-on sleeves of the kind employed in particular for the encapsulation or insulation of components, and which are manufactured by vigorous heating, expansion and "freezing-in" of the expanded state in which they are sold. The novelty of the invention, however, is the manner in which the memory effect is exploited, namely by commencing from tubes in the equilibrium state and, conveniently at the location where the joint is to be effected, deforming at least one of the tubes so that it is given a shape which differs from the shape in the equilibrium state, i.e., the so-called elastic memory.

In the case of crystalline polymers, deformation is preferably carried out in the cold state, that is to say below the temperature at which the polymer tends to revert to the equilibrium state, i.e., the crystalline melting point, and for the sake of simplicity this temperature will be referred to hereinafter as the softening point. The material is thus very flexible below the softening point and dilation or expansion of the tube can for example be performed extremely simply by the use of a mandrel in the cold state. Deformation can, of course, be produced above the softening point as well, although this means that the shape must be retained by the use of some kind of support until the material has set or until the tube ends are assembled together. The latter method is consequently not as simple as the method of deformation in the cold state, but has to be used with non-crystalline polymers which are generally not flexible below the glass transition temperature (softening point).

The new shape is retained until the temperature is raised to the softening point at which, in the case of crystalline polymers, the crystallites soften and begin to melt. At the melting point, the material tends to revert to its equilibrium configuration, due to the memory effect. The melting point depends upon the type of polymer and upon the degree of cross-linking, and can readily be determined by the person skilled in the art. As an example, it can be pointed out that the melting point of cross-linked polyethylene of the kind nowadays used for hot water applications, is of the order of 120°–130°C.

In addition to the fact that the method of the invention is significantly simpler than hitherto known methods of joining rigid tubes of cross-linked polymers, it has surprisingly been found that the joints produced are completely fluidtight and furthermore that they exhibit an extraordinary degree of stability. This stability, or in other words strength, is far in excess of that which might be expected due to the friction between the tube sections which have been joined together. It would appear that fusing together of the material at the joint location, occurs. It is important, therefore, that heating should be continued for a sufficient length of time to allow the fusing to take place. This time is naturally dependent upon the type of polymer and can readily be determined by the person skilled in the art in accordance with the desired stability (strength). Generally, only a short time after the deformed tube end has acquired its final position, the stability is extremely high. It is worthy of mention, as an example, that a heat treatment at 160°C lasting 10 minutes (this includes the time taken to regain the original shape) carried out on polyethylene tube joints, has yielded joints which hold together up to the yield point and even up to axial strains of better than 200 percent. There was no occurrence of fractures in the joint.

If the joint is to be specially designed to withstand high tensile stresses at high temperatures, then in association with the heat treatment, a chemical bond of cross-linked polymers will have to be developed. The phenomenon of three-dimensional lattice formation in polyethylene is already well known. It is akin to the phenomenon of vulcanizing in the case of rubber. The three-dimensional lattice can be formed by high-energy radiation or by means of cross-linking agents which generate free radicals, for example organic peroxides. The invention is based upon the consideration that the tube reverts to its equilibrium shape and that the molecules have established regular contacts across the joint prior to cross-linking. This can be achieved by the use of high-energy radiation, for example electron bombardment, but in that case increased degree of cross-linking across the tube wall results and this can give rise to an undesired effect, quite apart from which the radiation method is expensive. It is simpler to use a crosslinking agent such as a peroxide which does not begin to react until above the softening point of the tube. These properties are possessed, for example, by dicumyl peroxide which has the formula

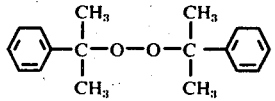

Dicumyl peroxide starts to break down at 135°C and then results in the production of two cumyloxy radicals each of which breaks down in accordance with the following formulae, into an acetophenone and a methyl radical:

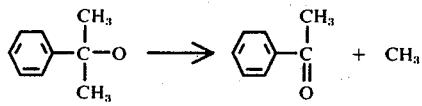

The cumyloxy radical as well as the methyl radical can split off hydrogen atoms from polyolefines and thus create polyolefine radicals which recombine and generate a three-dimensional lattice. The surface of one tube end or sleeve is treated, therefore, with the cross-linking agent, for example cumyl peroxide (which is a liquid above around 32°C) before the above described heat treatment is carried out. The treatment can be performed quite simply by dipping the components in molten peroxide, whereafter they may be allowed to cool and joined together. Joints produced by this method, continue to retain full strength even in excess of the softening point.

Although the method has for the most part been described by reference to crosslinked polyethylene, the invention is by no means limited to this material alone. Any cross-linked polymer exhibiting the memory effect, can be used. Preferably, a crystalline or at least partially crystalline polymer will be employed. Examples of other polymers which can be used beside polyethylene include other polyolefines, such as polypropylene or polyisobutylene, and polyamides (nylon).

The method can be applied to joining operations of three main types, namely the fixed sleeve, loose sleeve and tee-piece or junction box type.

A fixed sleeve joint is one of the kind in which one tube end is expanded to such an extent that the other tube end can be inserted into it. Alternatively, one tube end can be shrunk to such an extent that it can be inserted into the other, undeformed tube end. To a certain extent, these two methods can be employed simultaneously, that is to say one end can be expanded at the same time that the other is shrunk. To achieve a joint of the shrinkage type, it is necessary in this case for the internal diameter of that tube end which is to be slipped over the other tube end, to be less than or at the most equal to, in the equilibrium state, the external diameter of the other tube end when the latter is in its equilibrium state.

To achieve an extra locking effect at the joint, a ring preferably of metal, can be shrunk into the inner one of the two tube ends which are to be joined together, so that a bead is formed over it. Accordingly, the metal ring can be in position at the time of making the joint. In this case, both the tube ends are expanded, that is to say that that end into which the ring is to be fitted, is expanded sufficiently to allow the ring to be assembled there, whilst the other tube end is expanded sufficiently to allow it to be threaded over the expanded end containing the ring.

In the case of joints of the loose sleeve kind, at least one short tube is used which is deformed over its full length whereafter the ends of two other tubes are inserted into or slipped over the deformed short tube section, from both ends so that they butt up against one another.

When using a short tube section with an internal diameter which is at the most equal to the external diameter of the two other tubes (in both cases the diameters in the equilibrium state are intended), the short tube section is expanded (or alternatively the two other tubes shrunk) so that the two other tubes can be inserted into it.

If, on the other hand, a short tube section with an external diameter which is at least equal to the internal diameter of the two other tubes (in both cases it is the equilibrium states which are intended) is used, then the short tube section is shrunk (alternatively, the two other tubes are expanded) so that the two other tubes can be slipped over it.

To achieve an even stronger joint, it is possible to use both internal and external sleeves simultaneously.

With a transition from a tube of large diameter to a tube of small diameter it is possible, if it is not wished to slip the smaller diameter tube (in the expanded state) over the larger diameter tube, to employ a short tube section with an internal diameter smaller than the external diameter of the smaller tube, and an external diameter larger than the internal diameter of the larger tube. Said short tube section is assembled, using the technique in accordance with the invention, between the large diameter tube and the small diameter tube, for example by shrinking it on to the small diameter tube and shrinking the larger diameter tube on to the short tube section itself.

Joints using fixed or loose sleeves would appear, at first sight, to be like ordinary shrunk-on connections. However, the differences are substantial. With an ordinary shrunk-on connection, tube and sleeve have different temperatures. Using the method in accordance with the present invention, the temperature in the components which are being joined together, is the same. The normal forces in the joint surface would tend to relax in a shrinkage fit, when heating took place. In the present case, however, relaxation results in normal forces. Added to this, there is the fact that some form of fusing together obviously takes place which means that the joint can not only withstand shear forces but also a substantial tensile force, something which tests on axially cut joints, have shown.

The method in accordance with the present invention can, as discussed above, also be employed to manufacture tee-pieces or junction boxes. In this case, an opening is made in a wall, for example a wall of a tube or a junction box, at the location where the branches are required. Then, deformation is carried out by expanding the openings which have been formed and/or by shrinking the ends of the other tubes, so that said ends can be inserted into the respective openings. To produce a shrinkage type of joint, it is necessary to produce an opening whose diameter in the equilibrium state is at the most equal to the external diameter (in the equilibrium state) of the tube end which is to be inserted into the opening. Conversely, the tube may be selected so that its external diameter is at least equal to the diameter of the opening. If we call the tube in which the opening has been formed, the main tube, and the other tube the side tube, then the side tube can be inserted at right angles to the longitudinal axis of the main tube, or at an angle other than 90°. In either case, the center line of the side tube can moreover either intersect the center line of the main tube or be offset to one side thereof. The angle made between the side tube and the main tube, is adjusted by means of the angle at which the opening is cut in the main tube.

The above described method of producing a tee-piece yields good stability (strength) when using a main tube having a relatively large wall thickness. If the wall thickness is small, then preferably the method will be combined with the loose sleeve method described earlier, this in effect meaning that the wall thickness is increased at the branch location.

To achieve improved locking between side tube and main tube, a metal ring whose diameter is greater than the diameter of the opening, can be shrunk into the side tube. Another form of locking is to arrange for the opening in the tube wall to be stepped, the side tube being correspondingly stepped by the use of upsetting, i.e., production of an increased tube wall thickness. The advantage of this procedure is that the normal force around the tube at the point at which it enters the opening and has to withstand longitudinal forces, can be increased.

Where the tee-pieces or junction boxes manufactured in accordance with the invention are concerned, the material is subjected exclusively to compressive stresses which means that the risk of creep distortion is minimal. The stability has shown itself to be extraordinarily high.

Viewed overall, the method of the invention exhibits major advantages, not least of which is its simplicity. On building sites, all that is needed for tube joining operations, is a mandrel and a heating device, e.g., a blow-lamp or an electrical heater element. Another advantage is that if a leak occurs, it can be repaired simply by emptying the system and heating the leakage location to a temperature above the softening point. The material then tends to revert once again to its original form. Tests have shown tube joints to hold together up to the yield point and even up to axial extensions of over 200 percent. No fractures were observed in the joints.

The invention will now be explained in more detail in association with the attached drawings, where FIG. 1a illustrates an axial section through a joint of fixed sleeve type;

Figure 1A:
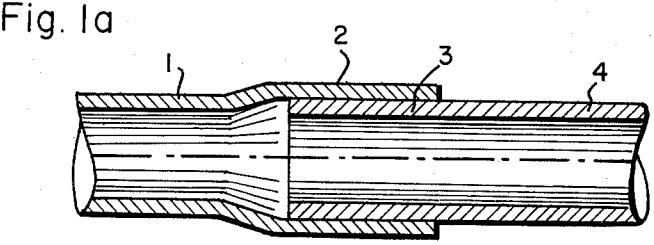
FIG. 1b illustrates an axial section through a joint of fixed sleeve type, with a shrunk-in metal ring.

The joint illustrated in FIG. 1a involves a tube 1 the end 2 of which is shaped as a fixed sleeve around the end 3 of another tube 4. The joint is produced in the following manner:

The tubes 1 and 4 have the same dimensions, i.e., the same internal and external diameters, in the so-called equilibrium state. The end 2 of tube 1 is expanded in the cold state, over a mandrel whose diameter is greater than the external diameter of tube 4. The end 3 of tube 4 is subjected to a heat treatment at above the softening point, for sufficiently long time for the crystallites to melt and for the restoration of shape at the end 2 to commence. When heating is ceased, the end 2 occupies the position shown in FIG. 1a.

Figure 1B:
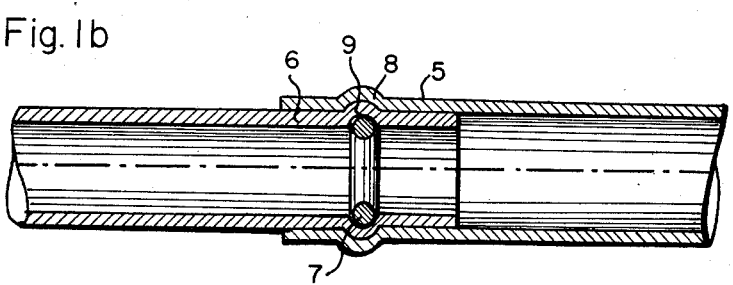

FIG. 1b illustrates a joint comprising a tube end 5 formed as a fixed sleeve around another tube end 6. Inside the end 6 there is a shrunk-in metal ring 7 producing beads 8 and 9 in the respective tube ends 5 and 6, which beads provide an additional locking effect between the ends 5 and 6.

The joint is produced either by commencing from the tube end 6 with the shrunk-in ring 7 and following the procedure adopted with the joint of FIG. 1a, or by introducing the ring 7 at the same time that the tube ends are assembled together. In the latter case, the joining procedure is started with both the ends 5 and 6, the end 5 having an internal diameter which corresponds to the external diameter of the end 6, the end 6 being expanded in the cold state over a mandrel whose diameter is greater than the external diameter of the ring 7. The tube end 5 is expanded in the cold state over another mandrel of larger diameter, that is to say having a diameter such that the tube end 5 can be slipped over the expanded tube end 6. The metal ring 7 is introduced into the tube end 6 and the tube end 5 is slipped over it. The joint location is heated to above the softening point and heating is discontinued when the tube ends 5 and 6 have reached the state shown in FIG. 1b. The shrunk-in ring 7 produces beads 8 and 9.

Figure 2A:
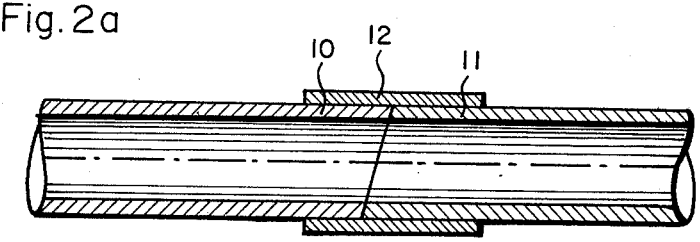
FIG. 2a illustrates an axial section through a joint of loose external sleeve type.

The joint shown in FIG. 2a comprises a tube end 10 with an oblique end face and another tube end 11 with a corresponding oblique end face in contact with that of the tube 10. Around the ends 10 and 11, there is an external sleeve 12.

The joint is formed commencing from the two tube ends 10 and 11 which are of the same size and from a tube 12 whose internal diameter is smaller than the external diameter of the tube ends 10 and 11. The tube 12 is then expanded over a mandrel having a diameter in excess of the external diameter of the ends 10 and 11. The tube ends 10 and 11 are inserted from either side into the tube 12 until their terminal faces are in contact with one another. When the joint location is heated up, the tube 12 tends to revert to the equilibrium state and thus forms an external sleeve around and in fluid-tight contact with, the ends 10 and 11.

Figure 2B:
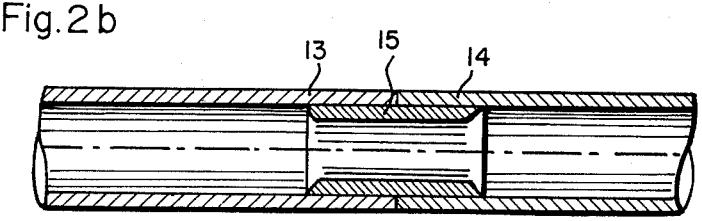
FIG. 2b illustrates an axial section through a joint of loose internal sleeve type.

The joint shown in FIG. 2b comprises two tube ends 13 and 14 which have straight end surfaces in contact with one another, and an internal sleeve 15.

The joint is produced in a manner similar to that described in the case of the joint of FIG. 2a, with the distinction that the starting point is a tube 15 having an external diameter which is greater than the internal diameter of the tube ends 13 and 14, the tube 15 being shrunk and the ends 13 and 14 passed over it.

Figure 3A:
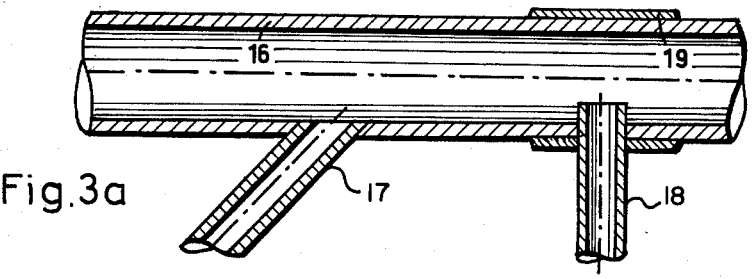
FIG. 3a illustrates an axial section through two joints of the tee-piece or junction box type.

In FIG. 3a, joints of the tee-piece or junction box type can be seen. Into a wall of a larger tube 16, there is inserted a smaller tube 17 and another smaller tube 18. The tube 18 is inserted in such a fashion that its center line makes a right angle with the center line of the tube 16, whilst the tube 17 is inserted in such a fashion that its center line makes an angle other than 90°, with the center line of the tube 16. The tube 16 is moreover reinforced by an external sleeve 19 at the point of insertion into the tube 18.

The joints shown in FIG 3a are produced commencing from a tube 16 on which an external sleeve 19 is formed in accordance with the technique described in association with FIG. 2a. In the tube 16, an opening is cut the center line of which makes an oblique angle with the center line of the tube 16 and the diameter of which is somewhat less than the external diameter of the tube 17. Through the sleeve 19 and the tube 16, another opening is cut, with a slightly smaller diameter than the external diameter of the tube 18 and with a center line which intersects the center line of the tube 16 at right angles. The tubes 17 and 18 are then inserted into the respective openings and the joint locations are heated to above the softening point of the material until the tube 16 is in fluid-tight contact with the tubes 17 and 18.

Figure 3B:
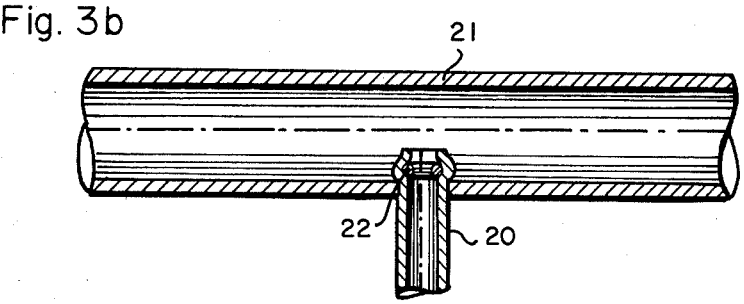
FIG. 3b illustrates an axial section through a joint of the tee-piece or junction box type, with an extra locking facility in the form of a shrunk-in metal ring.

The joint in FIG. 3b involves a thin tube 20 inserted into a large tube 21, and a metal ring 22 shrunk into the tube 20.

The end of the thinner tube 20 is expanded over a mandrel so that the metal ring 22 can be inserted into it. In the larger tube 21 an opening is cut the diameter of which is less than the external diameter of the undeformed tube 20. Using a mandrel, the opening in the tube 21 is expanded to a diameter which exceeds the external diameter of the expanded tube 20. The tube 20 is inserted into the expanded opening until the metal ring 22 is located inside the wall of the tube 21. The joint location is heat treated in the manner indicated earlier, so that the end of tube 20 shrinks around the ring 22 and the opening in the tube 21 shrinks around the undeformed part of the tube 20.

Figure 3C:
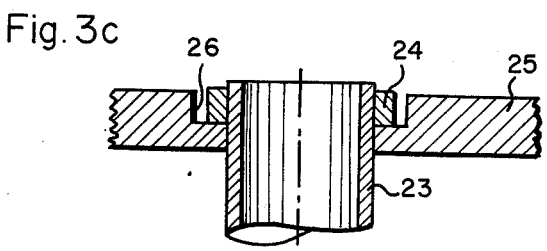
FIG. 3c illustrates an axial section through a joint of tee-piece or junction box type, with locking by the stepping method.

The joint shown in FIG. 3c comprises a tube 23 equipped with an upset portion 24 in the form of a piece of tube made of the same material, the tube 23 being inserted into a stepped 26 opening in a wall 25.

The joint is preferably created by shrinking the tube section 24 on to the tube 23 in accordance with the technique described earlier and by expanding the opening in the wall 35 so that the tube 23 with the tube section 24 crimped on to it, can be inserted there. When the joint location is heated to above the softening point, the joint acquires the shape shown in FIG. 3c.

Figure 3D:
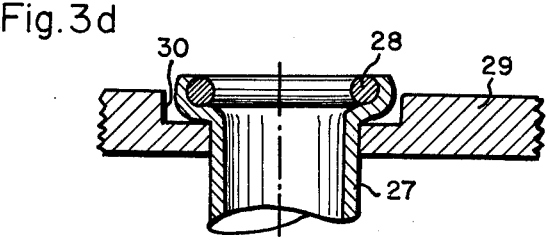
FIG. 3d illustrates an axial section through a joint of tee-piece or junction box type, locking by the use of both a shrunk-in ring and stepping.

FIG. 3d illustrates a tube 27 with a shrunk-in ring 28 inserted into a wall 29 exhibiting a step 30. The joint is produced in the same fashion as that shown in FIG. 3c with the exception that, whereas in the latter case the tube section 24 was shrunk onto the tube 23, in this case the ring 28 is shrunk into the tube 27.

Figure 4:
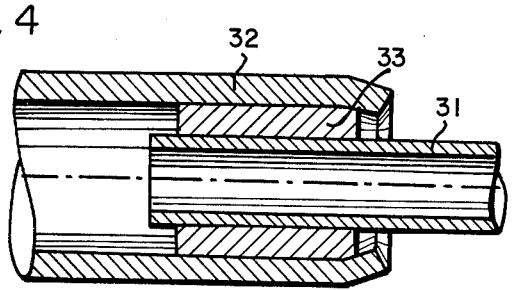
FIG. 4 illustrates an axial section through a joint between a large diameter tube and a small diameter tube, using an intervening sleeve.

FIG. 4 illustrates a joint between a thin tube 31 and a large tube 32, with an intervening tube section or sleeve 33 likewise of cross-linked polymer.

The joint can be produced in a number of alternative ways, as the person skilled in the art will readily appreciate. For example, the tube 31 can be compressed and inserted into the tube section 33 and the tube 32 expanded and slipped over the tube section 33, whereafter the joint location is heated to above the softening point.

What I claim is:

1. A method of joining at least two components made of cross-linked polymers that possess a memory effect and are heat expandable or heat shrinkable, the first of said components being a tube and the second having an opening into which an end of the tube can be inserted, the original size of said opening being no greater than the original external size of said tube end, comprising the steps of
   a. adjusting at least one of said original sizes so as to enable insertion of the tube end into said opening, whereby at least one of said components is imparted with the memory effect;
   b. inserting said tube end into said opening to form a joint location;
   c. heating said joint location to a temperature, which as a result of the memory effect causes said components to return to their original sizes and to form a joint and to fuse together over said joint.

2. The method of claim 1 wherein said second component is a tube having an open end into which an end of the first tube can be inserted.

3. The method of claim 2 for producing a joint of the fixed sleeve type wherein said adjustment in step (a) comprises enlarging the size of the open end of the second component so that the end of the first component can be inserted therein.

4. The method of claim 2 for producing a joint of the fixed sleeve type, wherein said adjustment in step (a) comprises reducing the size of the end of the first tube so that said end can be inserted in said open end of the second tube.

5. The method of claim 2 for producing a joint of the fixed sleeve type, wherein said adjusting in step (a) comprises enlarging the size of said open end of the second tube and reducing the size of the end of the first tube so that said end can be inserted in said open end.

6. The method of claim 2 for producing a joint of the loose sleeve type comprising using a third tube having both ends open, the original internal size of which is no greater than the original external sizes of the two other tubes, and enlarging, in step (a), the internal size of said third tube so that one of each of the two other tubes can be inserted in one of each of said open ends to form said joint location wherein the ends of said two other tubes inside of said third tube butt up against one another.

7. The method of claim 2, for producing a joint of the loose sleeve type, comprising using a third tube, the original external size of which is equal or greater than the internal sizes of the two other tubes, and, in step (a), reducing the external size of said third tube so that the two other tubes can each be slipped over the respective ends of said third tube to form said joint location of step (b) wherein the ends of said two other tubes butt up against one another.

8. The method of claim 1 wherein said second component is a tube having an opening which is not at either end of the tube into which an end of the first tube can be inserted to form a joint of the tee-piece type.

9. The method of claim 8 comprising enlarging, in step (a), the size of said opening so that the end of the first tube can be inserted therein.

10. The method of claim 8 comprising reducing, in step (a), the size of the end of the first tube so that said end can be inserted in said opening.

11. The method of claim 8 wherein adjustment step (a) comprises enlarging the size of the opening and reducing the size of the end of the first tube so that the end of the first tube can be inserted in the opening.

12. The method of claim 1 wherein said second component is a junction box having an opening into which an end of the tube can be inserted.

13. The method of claim 12 wherein, in step (a), the size of said junction box opening is enlarged so that the end of the tube can be inserted therein.

14. The method of claim 12 wherein, in step (a), the size of the end of the tube is reduced so that said end can be inserted in said junction box opening.

15. The method of claim 12 wherein, in step (a), the size of said junction box opening is enlarged and the size of the end of the tube is reduced so that the end of said tube can be inserted in said junction box opening.

16. The method of claim 1 wherein adjustment step (a) is carried out with a mandrel.

17. The method of claim 1 comprising using components made wholly or partially of crystalline polymers and wherein adjustment step (a) is carried out at a temperature below the crystalline melting point of the polymer and said heating in step (c) is carried out at a temperature equal to or greater than the crystalline melting point.

18. The method of claim 17 wherein the polymer is cross-linked polyethylene.

19. The method of claim 1 wherein adjustment step (a) is carried out in the cold state.

20. The method of claim 1 wherein the resultant joint is bombarded with high-energy radiation.

21. The method of claim 1 wherein prior to the heating in step (c), at least one of the components is coated with a cross-linking agent, which produces free radicals at a temperature in excess of the softening point of the polymer.

22. The method of claim 21 wherein the cross-linking agent is a peroxide.

23. The method of claim 1 wherein a ring is coaxially disposed in the end of the tube, which ring has an external diameter which is greater than the size of the opening of said second component.

24. The method of claim 23 wherein the ring is metal.

25. The method of claim 8 wherein said opening has been given a stepped form and wherein the tube end to be inserted therein has been stepped in a corresponding way.

26. The method of claim 1 for joining a first tube to a second tube, the external size of the first tube being smaller than the internal size of the second tube, comprising using a third tube section, the internal size of which is no greater than the external size of said first tube and the external size of which is at least as great as the internal size of said second tube, and adjusting the size of at least one of said three tubes so that said first tube can be inserted into one end of the third tube and the second tube can be slipped over the other end of the third tube.

27. A joint prepared by a method as claimed in claim 1.

* * * * *